US012790023B2

(12) United States Patent
Aslam

(10) Patent No.: US 12,790,023 B2
(45) Date of Patent: Nov. 10, 2026

(54) REFUELLING STRUCTURE

(71) Applicant: Airbus Operations Limited, Bristol (GB)

(72) Inventor: Mohammad Aslam, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

(21) Appl. No.: 19/305,194

(22) Filed: Aug. 20, 2025

(65) Prior Publication Data

US 2026/0084836 A1 Mar. 26, 2026

(30) Foreign Application Priority Data

Sep. 26, 2024 (GB) ..................................... 2414118

(51) Int. Cl.
*B64F 1/28* (2006.01)
*B64F 1/305* (2006.01)

(52) U.S. Cl.
CPC ................ *B64F 1/28* (2013.01); *B64F 1/305* (2013.01)

(58) Field of Classification Search
CPC .... B64F 1/28; B64F 1/30; B64F 1/305; B64F 1/36; B64F 5/40
See application file for complete search history.

(56) References Cited

U.S. PATENT DOCUMENTS 4,620,339 A * 11/1986 Shepheard .............. B64F 1/305 14/71.5
5,505,237 A * 4/1996 Magne .................... B64F 1/305 14/72.5
5,996,649 A * 12/1999 Sutton ................... F17C 13/023 141/59
6,012,292 A * 1/2000 Gulati ................... F17C 13/004 62/50.7
6,213,515 B1 * 4/2001 La Terra ................. E01B 27/04 280/4
7,464,734 B2 * 12/2008 Liu ........................... F17C 7/02 62/50.7

(Continued)

FOREIGN PATENT DOCUMENTS

GB 2636073 A * 6/2025 ............ B64D 37/30

OTHER PUBLICATIONS

United Kingdom Intellectual Property Office Search Report in GB Application No. 2414118.6 dated Mar. 26, 2025, 4 pages.

*Primary Examiner* — Nicolas A Arnett
(74) *Attorney, Agent, or Firm* — KDW Firm PLLC

(57) ABSTRACT

A structure for refuelling an aircraft with cryogenic fuel includes a walkway to allow personnel to access the aircraft and a pipework arrangement attached to the walkway. The pipework arrangement includes a feed line, a return line and a bypass valve between the feed line and the return line and fluidically connecting the inlet line to the return line. A first end of the feed line is configured to connect to a source of cryogenic fuel, and a second, opposite end of the feed line is configured to connect to the aircraft. The bypass valve is switchable between a refuelling configuration in which the bypass valve prevents fluid flow between the feed line and return line through the bypass valve, and a chill down configuration in which the bypass valve allows fluid flow between the feed line and the return line through the bypass valve.

13 Claims, 4 Drawing Sheets

(56) References Cited

U.S. PATENT DOCUMENTS

| | | | | |
|---|---|---|---|---|
| 7,614,585 | B2 * | 11/2009 | McCoskey | B64C 25/405<br>14/71.5 |
| 8,490,562 | B1 * | 7/2013 | Shivers, III | B63B 27/30<br>114/230.17 |
| 10,322,823 | B2 * | 6/2019 | Tengman | B64F 1/305 |
| 12,655,010 | B1 * | 6/2026 | Haberbusch | B67D 7/80 |
| 2006/0237591 | A1 * | 10/2006 | McCoskey | B64C 25/42<br>244/135 R |

* cited by examiner

REFUELLING STRUCTURE

TECHNICAL FIELD

The disclosure herein relates to a structure for refuelling an aircraft with cryogenic fuel and an associated method.

BACKGROUND

As the desire for lower emission aircraft increases, so does the use of alternative fuels in aircraft. One of the alternatives is the use of cryogenic fuel. As with conventional fuels, it may be necessary to replenish the fuel tanks of the aircraft when at an airport with the cryogenic fuel. Due to the temperature at which cryogenic fuels are stored, it may be desirable to cool down the pipework before beginning refuelling. However, when the refuelling equipment has to be transported to the aircraft, it may take time to set up and cool down before being able to refuel the aircraft. This may increase the turnaround time for the aircraft which may be undesirable. The disclosure herein aims to address these problems and may therefore reduce turnaround times.

SUMMARY

According to a first aspect, there is provided a structure for refuelling an aircraft with cryogenic fuel, the structure comprising: a walkway configured to allow personnel to access a door of the aircraft; and a pipework arrangement attached to the walkway, the pipework arrangement comprising: a feed line; a return line; and a bypass valve arranged between the feed line and the return line and fluidically connecting the inlet line to the return line, wherein a first end of the feed line is configured to connect to a source of cryogenic fuel, and a second, opposite end of the feed line is configured to connect to the aircraft; and wherein the bypass valve is switchable between: a refuelling configuration in which the bypass valve prevents fluid flow between the feed line and return line through the bypass valve; and a chill down configuration in which the bypass valve allows fluid flow between the feed line and the return line through the bypass valve.

The structure according to the first aspect allows the pipework arrangement to be chilled before connection to the aircraft. This may help to reduce turnaround times for the aircraft.

A first end of the return line may be configured to connect to the source of cryogenic fuel, and a second, opposite end of the return line may be configured to connect to the aircraft.

The cryogenic fuel may comprise liquid hydrogen. The cryogenic fuel may comprise a different cryogenic fluid, such as liquid nitrogen, liquid oxygen or liquid helium. The cryogenic fuel may comprise a gaseous fluid, such as gaseous hydrogen, gaseous nitrogen or gaseous helium.

The cryogenic fuel may be stored at a temperature of approximately −253 degrees Celsius. This may ensure that the cryogenic fuel remains in a liquid state.

The source of cryogenic fuel may comprise a static source of cryogenic fuel. The source of cryogenic fuel may comprise an underground storage tank. This may avoid the need to physically transport the cryogenic fuel to the location of the aircraft.

The source of cryogenic fuel may comprise a moveable source of cryogenic fuel. This may allow the source of cryogenic fuel to be moved to wherever it is needed and may allow the source of cryogenic fuel to move to a different location for refilling if required. The moveable source of cryogenic fuel may comprise a tanker.

The connection between the inlet line and the source of cryogenic fuel may be located at ground level. This may allow for easy connection by ground staff.

The connection between the feed line and the source of cryogenic fuel may be a removable connection. This may allow the feed line to be removed from the source of cryogenic fuel if required.

The connection between the feed line and the source of cryogenic fuel may be a permanent connection. This may reduce the likelihood of leaks occurring at a connection between the feed line and the source of cryogenic fuel. This may also speed up the refuelling process as it is not necessary to form the connection between the feed line and the source of cryogenic fuel each time refuelling is required.

The structure may comprise a controller configured to cause the bypass valve to switch between the chill down configuration and the refuelling configuration.

The pipework arrangement may move with the walkway. This may allow the pipework arrangement to be moved into position at the same time as the walkway, potentially speeding up the refuelling process.

The pipework arrangement may be insulated. This may help to maintain the temperature of the cryogenic fuel and keep the fuel in its liquid state. The inlet line and the return line may comprise vacuum insulated pipes.

The walkway may comprise a telescopic air bridge. The walkway may be configured to be attached to a terminal building at a first end and to the aircraft at a second end. The walkway may be moveable relative to the terminal building. The walkway may be configured to be extended and retracted. The walkway may be enclosed so as to protect the walkway from external environmental conditions.

The walkway may be movable between a first position for refuelling the aircraft and a second position for allowing passengers to board and/or disembark the aircraft. The walkway may comprise a first part and a second part, wherein the first part of the walkway extends to a door of the aircraft to allow passengers to board and/or disembark from the aircraft, while the second part of the walkway extends towards a different part of the aircraft to allow the pipework arrangement to connect to the aircraft for refuelling.

The second end of the feed line may comprise a motorized arrangement to cause movement of the second end of the feed line relative to the walkway aircraft. This may allow the second end of the feedline to be moved into proximity of the aircraft, or to connect to the aircraft, without the need for physical interaction with an airport worker.

The second end of the feed line may comprise a deformable hose. This may allow easier connection to the aircraft.

The pipework arrangement may comprise at least one of carbon fiber reinforced plastic (CFRP) and glass fiber reinforced plastic (GFRP). This may provide strength to the pipework arrangement. The pipework arrangement may comprise vacuum jacket insulated hoses.

BRIEF DESCRIPTION OF THE DRAWINGS

Embodiments of the disclosure herein will now be described, by way of example only, with reference to the accompanying drawings, in which.

DETAILED DESCRIPTION

Figure 1:
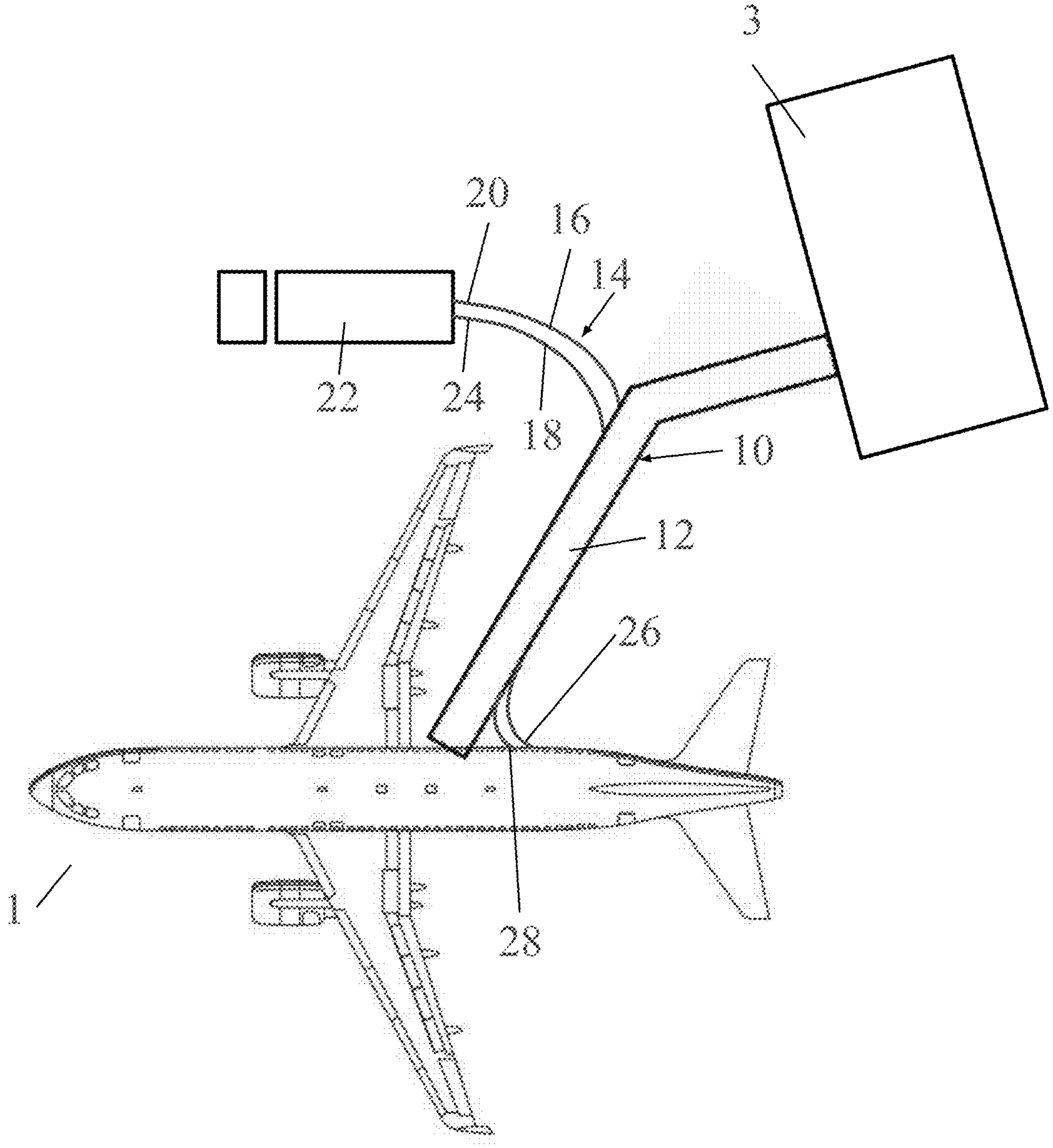
FIG. 1 shows a schematic view of an aircraft and a refuelling structure.

FIG. 1 shows a schematic diagram of an aircraft 1 parked at a gate of an airport terminal 3. While the aircraft 1 is parked at the gate, passengers, cargo and fuel are loaded and/or unloaded from the aircraft 1. In the example shown in FIG. 1, the aircraft 1 is refuelled with cryogenic fuel, in particular liquid hydrogen. The aircraft 1 comprises multiple fuel tanks (not shown in FIG. 1) for storing the fuel cryogenic fuel for use during flight. The fuel tanks are located in the aft section of the fuselage of the aircraft 1, but may in other examples be located in other parts of the aircraft (such as the center wing box, the wings of the aircraft or another part of the aircraft fuselage).

To provide the cryogenic fuel to the aircraft 1, a refuelling structure 10 is used. The structure comprises a walkway 12 which allows personnel (such as passengers or operators) access to the aircraft 1. The walkway 12 is covered to protect personnel using the walkway 12 from external environmental conditions (e.g. wind and rain). In other examples, the walkway 12 may be positioned to allow access to other doors or areas of the aircraft 1. The walkway 12 is moveable relative to the airport terminal 3 to allow positioning relative to the aircraft 1.

Attached to the walkway 12 is a pipework arrangement 14 (part of which is shown in isolation in FIGS. 2 and 3) comprising a feed line 16 and a return line 18. As the pipework arrangement 14 is attached to the walkway 12, the pipework arrangement 14 will move with the walkway 12. The pipework arrangement 14 comprises pipes that are configured to convey fuel (in this case cryogenic fuel) through the pipework arrangement 14. The pipes of the pipework arrangement 14 comprise double walled vacuum insulated pipes. This may help to prevent undesirable heat transfer and keep the cryogenic fuel chilled and in a liquid state when passing through the pipework arrangement 14.

A first end 20 of the feed line 16 is connected to a source of cryogenic fuel 22 which, in this example, is a tanker. The tanker carries the cryogenic fuel, in this case liquid hydrogen, to the aircraft 1 from another location at the airport. In other examples, the source of cryogenic fuel 22 comprises an underground storage tank and the first end 20 of the feed line 16 is attached to the underground storage tank. The first end 20 of the feed line 16 is removably connectable to the source of cryogenic fuel 22 to allow disconnection from the tanker when refuelling is not needed.

As mentioned above, the cryogenic fuel stored in the tanker is liquid hydrogen. In order to keep the hydrogen in its liquid state, the fuel is stored at approximately −253 degrees Celsius. In other examples, the cryogenic fuel may be a fuel other than hydrogen, such as liquid oxygen, liquid nitrogen or liquid helium.

A first end 24 of the return line 18 is also connected to the source of cryogenic fuel 22 proximate to the connection between the first end 20 of the feed line 16 and the source of cryogenic fuel 22. In use, the cryogenic fuel (in liquid or gaseous form), or hydrogen enriched air, may return along the return line 18 back into the source of cryogenic fuel 22. In some examples, the return line 18 is not connected to the source of cryogenic fuel 22, but may instead be connected to a separate storage device or may be recirculated within the pipework arrangement 14.

The pipework arrangement 14 comprises insulated pipes that are made from glass fiber reinforced plastic (GFRP). The pipes comprise an inner pipe and an outer pipe. The space between the inner pipe and the outer pipe is evacuated to provide thermal insulation to the inner pipe. The cryogenic fuel flows through the inner pipe and is insulated by the vacuum between the inner pipe and the outer pipe, which may reduce undesirable heat ingress into the cryogenic fuel.

A second end 26 of the feed line 16 is attached to a corresponding refuelling port on the aircraft 1. While in FIG. 1 this is shown on the fuselage of the aircraft 1, in other embodiments the refuelling port may be located on another part of the aircraft 1, such as the belly fairing or the underside of a wing of the aircraft 1. The refuelling port on the aircraft 1 is fluidically connected to the fuel tank of the aircraft 1.

The second end 26 of the feed line 16 comprises a deformable hose that connects to the refuelling port on the aircraft 1. While in the example shown in FIG. 1, the hose is manually positionable by an operator, in some examples the hose is automatically moveable into position using a motorized arrangement to avoid the need for the operator to have to handle the hose. The hose is flexible to allow for connection to different locations on different aircraft models. For example, on some aircraft 1 the hose may attach to the wing, whereas on other aircraft 1 the hose may attach to the fuselage of the aircraft 1.

A second end 28 of the return line 18 likewise comprises a flexible hose. The hose allows for liquid hydrogen, or hydrogen enriched air, to return from the aircraft 1 through the pipework arrangement 14 and into the source of cryogenic fuel 22 (when the return line 18 is connected to the source of cryogenic fuel).

Figure 2:
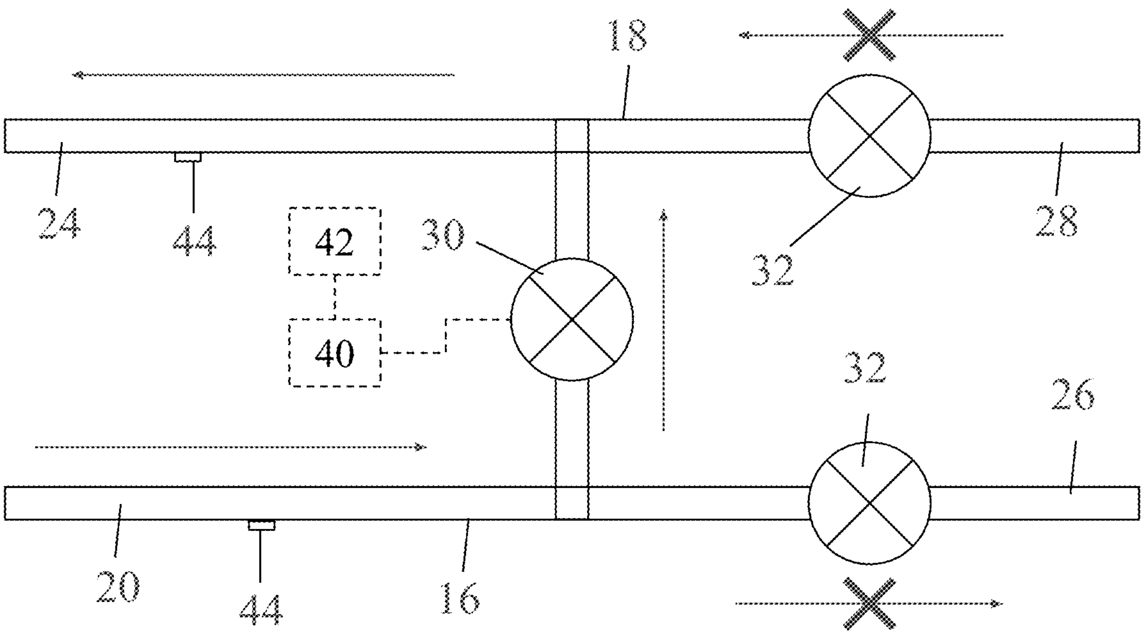
FIGS. 2 and 3 show a schematic view of part of a pipework arrangement of the refuelling structure of FIG. 1.
Figure 3:
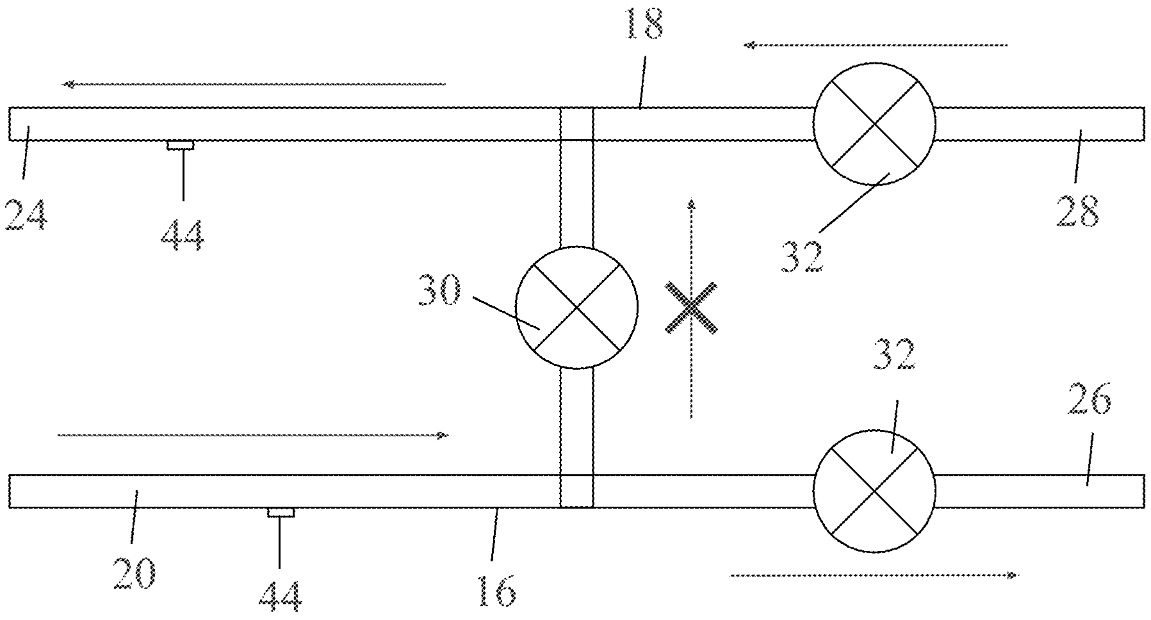

FIGS. 2 and 3 schematically show part of the pipework arrangement 14 of FIG. 1 in more detail. In addition to the feed line 16 and the return line 18 introduced above, the pipework arrangement 14 also comprises a bypass valve 30 located between the feed line 16 and the return line 18, two shut off valves 32 and temperature sensors 44.

The bypass valve 30 controls whether or not fluid can flow between the feed line 16 and the return line 18. The bypass valve 30 is switchable between a chill down configuration (shown in FIG. 2) whereby the bypass valve 30 is open and therefore allows fluid flow between the feed line 16 and the return line 18, and a refuelling configuration (shown in FIG. 3) whereby the bypass valve 30 is closed and prevents fluid flow between the feed line 16 and the return line 18 through the bypass valve 30. When the bypass valve 30 is in the chill down configuration, the two shut off valves 32 are also closed to prevent fluid from flowing out of the second ends 26, 28 of the feed line 16 and return line 18.

Before connection to the aircraft 1, the bypass valve 30 is in the chill down configuration. In this configuration, liquid hydrogen flows into the feed line 16, through the bypass valve 30 and then through and out of the return line 18 (as shown by the arrows in FIG. 2). This may cool down the pipework arrangement 14 before being connected to the aircraft 1.

Once the feed line 16 and the return line 18 have been connected to the aircraft 1, the bypass valve 30 is switched to the refuelling configuration and the shut off valves 32 are opened. This allows the cryogenic fuel to flow from the tanker, through the feed line 16 and into a fuel tank of the aircraft 1 (as shown by the arrows in FIG. 3). As the pipework arrangement 14 has been chilled before being connected to the aircraft 1, this allows refuelling to begin straight away once the pipework arrangement 14 is connected to the aircraft 1. As such, this may speed up the refuelling time, and therefore the turnaround time, of the aircraft 1.

Operation of the bypass valve 30 is controlled by a controller 40. The controller 40 is operatively connected to the bypass valve 30 and to a user interface 42 attached to the refuelling structure 10. To change the configuration of the bypass valve 30, an operator requests the change via an input on the user interface 42. The controller 40 subsequently receives this request and causes the configuration of the bypass valve 30 to change.

As mentioned above, the pipework arrangement 14 also comprises temperature sensors 44 to measure the temperature within different parts of the pipework arrangement 14. An output from the temperature sensors is displayed on the user interface 42 so that the operator can monitor temperatures within the pipework arrangement 14 and ensure that sufficient chill-down has occurred before the bypass valve 30 is switched to the refuelling configuration.

Figure 4:
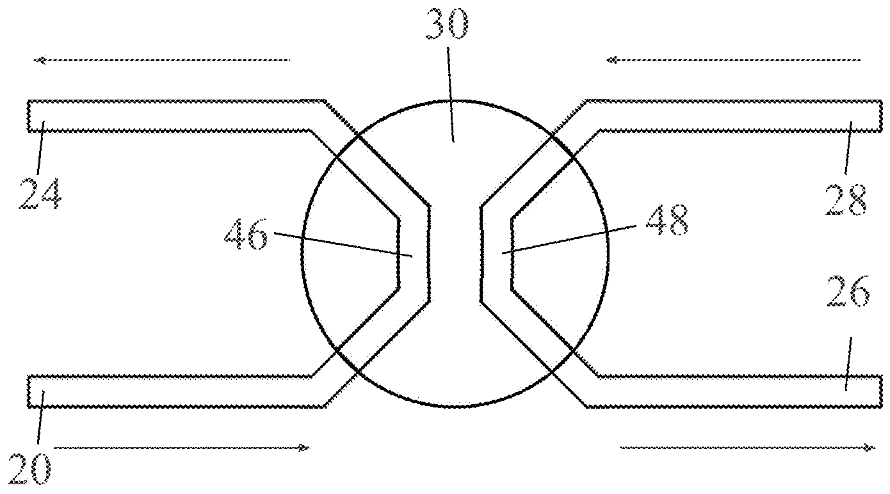
FIGS. 4 and 5 show a schematic view of an alternative pipework arrangement.
Figure 5:
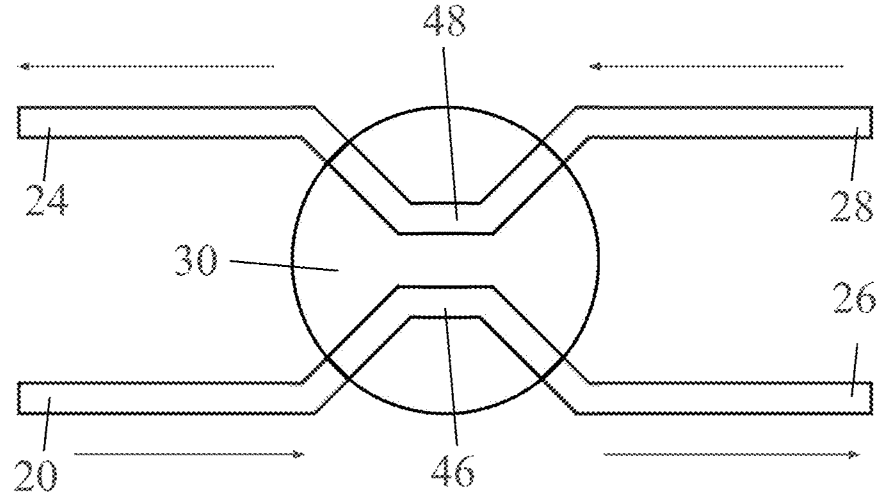

FIGS. 4 and 5 show an example where the bypass valve 30 comprises a four-way valve. In such an example, the shut off valves 32 may be omitted, which may therefore reduce the complexity of the pipework arrangement 14. The bypass valve 30 contains a first conduit 46 and a second conduit 48.

When the bypass valve 30 is in the chill down configuration (as shown in FIG. 4), the second end 26 of the feed line 16 is fluidically connected to the second end 28 of the return line 18 via the second conduit 48, while the first end 20 of the feed line 16 is fluidically connected to the first end 24 of the return line 18 via the first conduit 46. As such, cryogenic fuel does not flow from the first end 20 of the feed line 16 to the second end 26 of the feed line 16. Instead, the cryogenic fuel flows from the first end 20 of the feed line 16, through the first conduit 46 and to the first end 24 of the return line 18, allowing the pipework arrangement 14 to be cooled.

When the bypass valve 30 is in the refuelling configuration (as shown in FIG. 5), the first end 20 of the feed line 16 is fluidically connected to the second end 26 of the feed line 16 via the first conduit 46, while the first end 24 of the return line 18 is fluidically connected to the second end 28 of the return line 18 via the second conduit 48. This allows the cryogenic fuel to flow from the source of cryogenic fuel 22, through the pipework arrangement 14 and into the fuel tank in the aircraft 1. As the shutoff valves are not required in this example, this may reduce the complexity of the refuelling structure 10.

Figure 6:
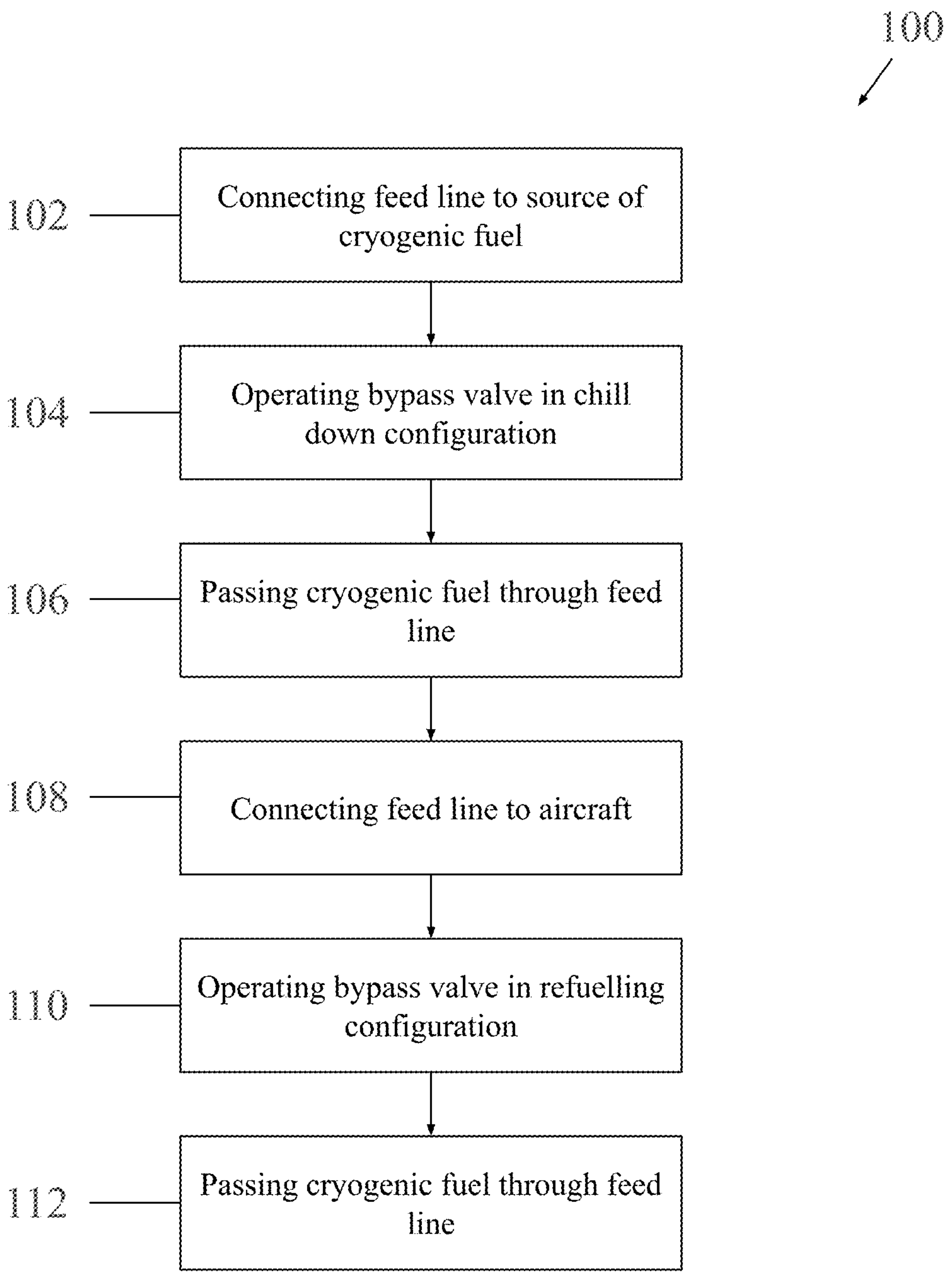
FIG. 6 shows a flow diagram of a method.

FIG. 6 shows a flow chart of a method 100 of refuelling the aircraft 1, using the refuelling structure 10 discussed above in relation to FIGS. 1 to 5. The method 100 comprises connecting 102 the first end 20 of the feed line 16 to the source of cryogenic fuel 22, operating 104 the bypass valve 30 in the chill down configuration, passing 106 the cryogenic fuel through the feed line 16 for a predetermined time period, connecting 108 the second end 26 of the feed line 16 to the aircraft 1, operating 110 the bypass valve 30 in the refuelling configuration, and passing 112 the cryogenic fuel from the source of cryogenic fuel 22, through the feed line 16 and to the aircraft 1.

In some examples, the step of connecting 102 the first end 20 of the feed line 16 to the source of cryogenic fuel 22 also comprises connecting the first end 24 of the return line 18 to the source of cryogenic fuel 22. In some examples, the step of connecting 108 the second end 26 of the feed line 16 to the aircraft 1 comprises connecting the second end 28 of the return line 18 to the aircraft 1.

Although the disclosure herein has been described above with reference to one or more preferred examples or embodiments, it will be appreciated that various changes or modifications may be made without departing from the scope of the disclosure herein as defined in the appended claims.

Although the disclosure herein has been described above mainly in the context of a fixed-wing aircraft application, it may also be advantageously applied to various other applications, including but not limited to applications on vehicles such as helicopters, drones, trains, automobiles and spacecraft.

Where the term "or" has been used in the preceding description, this term should be understood to mean "and/or", except where explicitly stated otherwise.

It should be understood that modifications, substitutions, and alternatives of the invention(s) may be apparent to one of ordinary skill in the art and can be made without departing from the scope of this disclosure. This disclosure is intended to cover any adaptations or variations of the example embodiment(s). In addition, in this disclosure, the terms "comprise" or "comprising" do not exclude other elements or steps, the terms "a", "an" or "one" do not exclude a plural number. Furthermore, characteristics or steps which have been described may also be used in combination with other characteristics or steps and in any order unless the disclosure or context suggests otherwise. This disclosure hereby incorporates by reference the complete disclosure of any patent or application from which it claims benefit or priority.

The invention claimed is:

1. A structure for refuelling an aircraft with cryogenic fuel, the structure comprising:
- a walkway for allowing personnel access to the aircraft; and
- a pipework arrangement attached to the walkway, the pipework arrangement comprising:
  - a feed line;
  - a return line; and
  - a bypass valve between the feed line and the return line and fluidically connecting the inlet line to the return line;
- wherein a first end of the feed line is configured to connect to a source of cryogenic fuel, and a second, opposite end of the feed line is configured to connect to the aircraft; and
- wherein the bypass valve is switchable between:
- a refuelling configuration in which the bypass valve prevents fluid flow between the feed line and return line through the bypass valve; and
- a chill down configuration in which the bypass valve allows fluid flow between the feed line and the return line through the bypass valve.

2. The structure according to claim 1, wherein a first end of the return line is configured to connect to the source of cryogenic fuel, and a second, opposite end of the return line is configured to connect to the aircraft.

3. The structure according to claim 1, wherein the cryogenic fuel comprises liquid hydrogen.

4. The structure according to claim 1, wherein the source of cryogenic fuel comprises a static source of cryogenic fuel.

5. The structure according to claim 1, wherein the source of cryogenic fuel comprises a moveable source of cryogenic fuel.

6. The structure according to claim 1, wherein the connection between the inlet line and the source of cryogenic fuel is located at ground level.

7. The structure according to claim 1, wherein the structure comprises a controller configured to cause the bypass valve to switch between the chill down configuration and the refuelling configuration.

8. The structure according to claim 1, wherein the pipework arrangement is insulated by insulation.

9. The structure according to claim 8, wherein the insulation is provided by a vacuum.

10. The structure according to claim 1, wherein the walkway comprises a telescopic air bridge.

11. The structure according to claim 1, wherein the walkway is configured to be attached to a terminal building at a first end and to the aircraft at a second end.

12. The structure according to claim 1, wherein the walkway is movable between a first position for refuelling the aircraft and a second position for allowing passengers to board and/or disembark the aircraft.

13. A method of refuelling an aircraft with cryogenic fuel, the method comprising:

using the structure according to claim 1;

connecting the first end of the feed line to the source of cryogenic fuel;

operating the bypass valve in the chill down configuration;

passing the cryogenic fuel through the feed line for a predetermined time period;

connecting the second end of the feed line to the aircraft;

operating the bypass valve in the refuelling configuration; and passing the cryogenic fuel from the source of cryogenic fuel, through the feed line and into the aircraft.

* * * * *